2 Sheets
Drawing No II

Original Patent Aug. 8. 1854

No. 2,748. Samuel Nicolson

Improvement in Wooden Pavements

Reissued

Aug 20 1867

Samuel Nicolson Inventor

Connolly & Clarke
Attorneys

Stephen H. Goodwin
Chas. F. Fryer

Drawing No. II Samuel Nicolson

Re 2748

Improvement in Wooden Pavements

Samuel Nicolson. Inventor

Correctly attested

Witnesses

Stephen A. Goodson

Charles F. Thayer

UNITED STATES PATENT OFFICE.

SAMUEL NICOLSON, OF BOSTON, MASSACHUSETTS.

IMPROVED WOODEN PAVEMENT.

Specification forming part of Letters Patent No. 11,491, dated August 8, 1854; Reissue No. 1,583, dated December 1, 1863; Reissue No. 2,748, dated August 20, 1867.

*To all whom it may concern:*

Be it known that the following is a full, clear, and exact description of the new and useful Improved Wooden Pavement invented by me, SAMUEL NICOLSON, of Boston, in the State of Massachusetts, and for which Letters Patent were granted to me on the 8th day of August, in the year of our Lord 1854, and for which new and Reissued Letters Patent were granted to me on the 1st day of December, in the year of our Lord 1863, the said last-mentioned Letters Patent having been surrendered for the purpose of describing the same invention and pointing out in what it consists in more clear, full, and exact terms than was done in the said original or amended specifications.

The nature and object of my invention consist in providing a process or mode of constructing wooden-block pavements upon a foundation along a street or roadway with facility, cheapness, and accuracy; and also in the creation and construction of such a wooden pavement for streets and roadways as shall be comparatively permanent and durable by so uniting and combining all its parts, both superstructure and foundation, so as to provide against the slipping of the horses' feet, against noise, against unequal wear, and against rot on or from the top surface, and against rot and consequent sinking away from below.

Figure 2:
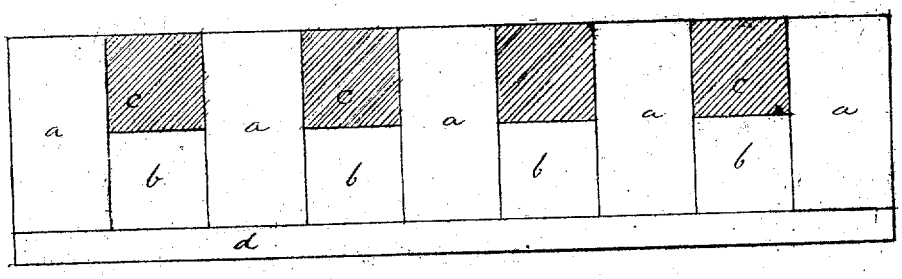
Figure 1:
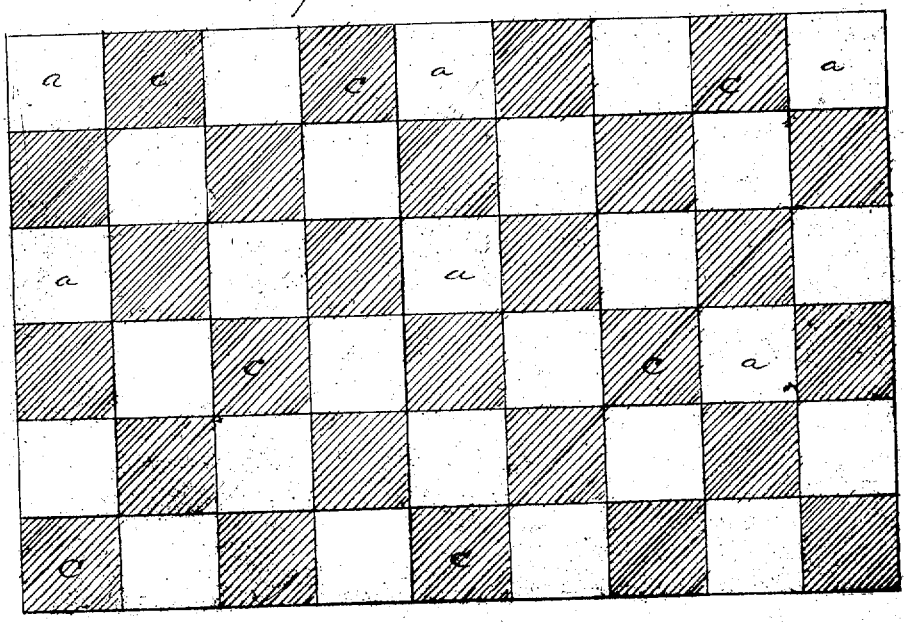
Figure 1:
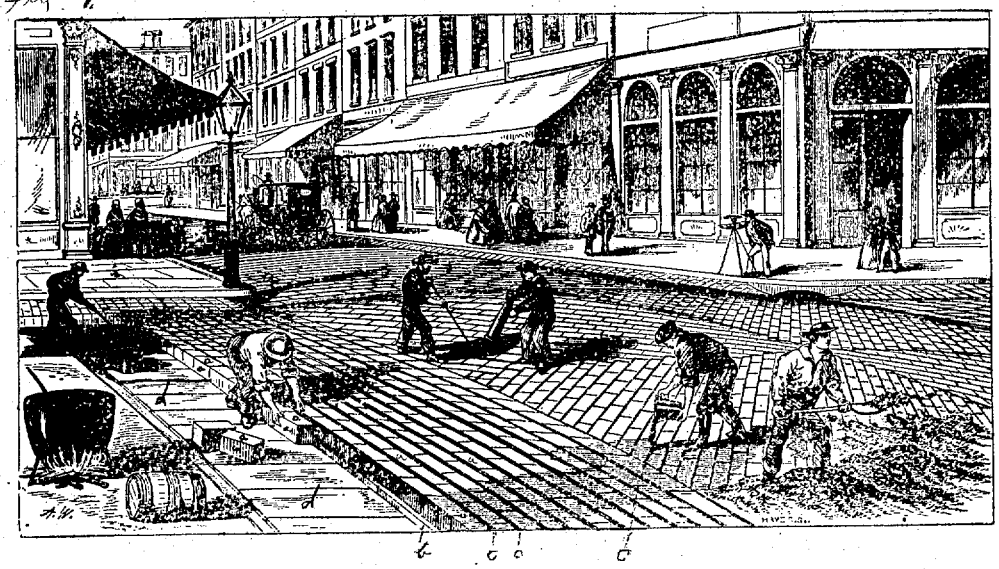
Figure 3:
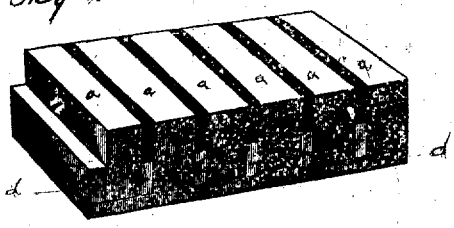
Figure 2:
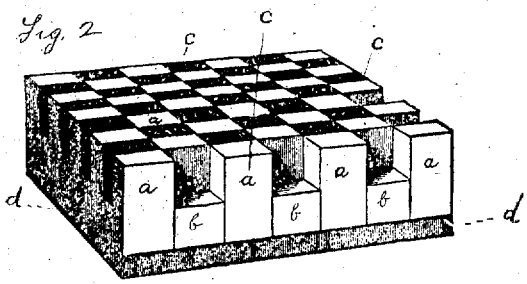

For a clear understanding of the manner of constructing my improved wooden pavement, I refer to the accompanying drawings, with corresponding letters of reference, making part of this specification, of which Drawing No. I, Figure 1, represents a top view of the first plan of said pavement, and Fig. 2 of the same drawing represents a transverse and vertical section of the same; and Fig. 1 of Drawing No. II represents a perspective view of the said pavement constructed and in the process of construction after the second plan or modification; and Fig. 2, Drawing No. II, a further perspective view of a section of the said pavement on the first plan; and Fig. 3, Drawing No. II, a further perspective view of a section of the said pavement on the second plan.

The earth of a roadway upon which my improved wooden pavement of either plan is to be constructed must first be suitably graded in any of the usual and well-known methods, in order to prepare it for the reception of such pavement. When the street or roadway has thus been prepared for the reception of my pavement, I then cover the surface of the road way or bed with tarred paper, or with hydraulic cement laid over it about two (2) inches in thickness, or with a cheap flooring of boards or plank, which may also be covered with tar on one or both sides by swabbing or by dipping the boards or plank; or any other preventative to moisture may be used in connection with said foundation or support, the object and effect of such foundation being the support afforded such pavement, and to prevent the absorption of moisture from the ground by the wooden blocks. Said foundation is designated in said drawings by the letters *d d*.

In further carrying out my invention I employ two (2) sets of blocks, or a set of blocks and strips. The one set of blocks, which may be called the "principal" set of blocks, forms, when the pavement is completed, the wooden surface of the pavement, and the other or auxiliary set of blocks or strips forms no part of the wooden surface of the pavement, but determines the size of the groove or channel way between the principal blocks, which is afterward to be filled with broken stone, gravel, and tar, while the principal set of blocks must be of uniform height and of suitable texture to form a proper surface for the pavement. The auxiliary set need be of no particular height or texture; but they must not permanently and entirely fill the grooving intended for the gravel, broken stone, and tar when the pavement is completed.

The principal set of blocks is cut with parallel sides, lines, or surfaces from joist or timber about four inches square, or of other suitable shape and dimensions in cross-sections, being made eight inches in length. The auxiliary blocks may be formed of about half the length of the others; but they must be of such thickness or cross-section as to form the proper boundary of the groove. The principal blocks are placed end upward upon said foundation or support, and are arranged both transversely and longitudinally, so that the principal and the auxiliary blocks shall be arranged alternately in each direction, or run as seen in the drawings. By such an arrangement spaces or cells *c c c*, between the principal blocks are formed, each of said cells being bounded by four of the principal blocks. The upper ends of the principal blocks, when thus placed together, present a checkered or tessellated appearance, and they will exhibit the open spaces arranged together in a similar manner. Into each of these cells a small quantity or layer of coarse salt may be put. These cells are filled up with small broken stone or coarse clean gravel, the whole being firmly rammed, so that the upper surface of the mass shall be firm and level. Next, mineral or vegetable tar or pitch is to be poured over the whole surface of the pavement and into the cells or cavities containing the broken stone or gravel, so as to penetrate entirely between the pieces of stone or gravel and cement them together. The tar penetrating into the squares containing the broken stone or gravel will cause the masses of the stone to adhere firmly to the surrounding blocks, and will admit of expansion of the mass by the weight of the wheels of carriages in passing over them, such expansion serving to fill up the space which might otherwise be made by shrinkage of the wooden blocks.

In order to prevent the blocks from being forced below one another in some of my modes of constructing the pavement, they may be pinned together with wooden pins extending from block to block.

Instead of the broken stone and tar, any other suitable cementing material may be employed in the cells. I prefer, however, common tar or pitch and gravel or broken stone, as such in practice has been found to operate to great advantage and to be very durable in use and to present a surface on which it is very difficult for horses to slip or slide, as is frequently the case on ordinary pavements when the surface is wet or covered with mud. The auxiliary strip may be about half the height of the principal block; but it must not be permitted to fill up the grooves permanently and entirely when the pavement is completed, or to form any part of the surface of the pavement.

My invention may be carried out in another form—that is to say, upon the plan or second modification seen in Figs. 1 and 2 of Drawing No. II. The principal blocks are arranged side by side transversely of the roadway, alternately with strips of board, edgewise or vertical, in thickness about one-third of the principal blocks, placed transversely upon the foundation or support, and in this mode of construction so arranged as to form spaces of about one inch in thickness between the rows of principal blocks.

I would remark, as to the durability of my pavement, that for the purpose of experiment I have had some of it in use for six years before the month of March, 1854, on a road on which the travel has been very great.

Some of the advantages of my pavement are to be found in the hold that it offers for the feet of horses, in the little noise that it produces while carriages are passing over it, the absence of noise resulting from the peculiar character of the material of which the pavement is composed.

This pavement is also very durable, its durability being occasioned by the friction of the travel over it, being produced upon the slightly elastic extremities of the fibers of the wooden blocks, and by its solidity and durable material in the filling.

Moisture is excluded from the wood by the materials employed for the support of the blocks, also by the preventives, also by the tarry covering which is placed over the top surface, as hereinbefore described.

My pavement has the advantage of great cleanliness in comparison with most other pavements, because, in the first place, as there is very little wear of its upper surface, very little dirt is likely to form upon it, and such as does form is quickly removed therefrom by rains and winds.

There is a further advantage in respect to facility, cheapness, and accuracy in the process or method of forming the channels, grooves, or receptacles required for the desired filling in my improved construction, which results from two sets or series of parallel sided blocks (or blocks and strips of board) employed as above mentioned. By this method of forming such channels, grooves, or receptacles, the parallelism of the same and of the principal blocks forming the ultimate surface of the pavement, and the uniformity in width or size and distance one from another of such channels, grooves, or receptacles, are effected in a cheap, simple, and expeditious manner directly upon the prepared foundation resting upon the roadway, and any necessity of constructing the pavement in portable compartments is avoided.

Having thus fully described the parts and combination of parts and the operation of my improved wooden pavement, and shown various modes in which the same may be constructed and made to operate without changing the principle of its construction and operation, I claim as an improvement in the art of constructing pavements—

1. Placing a continuous foundation or support, as above described, directly upon the roadway, then arranging thereon a series of blocks having parallel sides endwise in rows, so as to leave a continuous narrow groove or channel-way between each row, and then filling said grooves or channel-ways with broken stone, gravel, and tar, or other like materials.

2. The formation of a pavement by laying a foundation directly upon the roadway, substantially as described, and then employing two sets of blocks, one a principal set of blocks that shall form the wooden surface of the pavement when completed, and an auxiliary set of blocks or strips of board which shall form no part of the surface of the pavement, but determine the width of the groove between the principal blocks, and also the filling of said groove, when so formed, between the principal blocks, with broken stone, gravel, and tar, or other like material.

3. Placing a continuous foundation or support, as above described, directly upon the roadway, and then arranging thereon a series of blocks having parallel sides endwise in a checkered manner, so as to leave a series of checkered spaces or cavities between said blocks, and then filling said checkered cavities with broken stone, gravel, and tar, or other like material.

4. The formation of a pavement by laying a foundation directly upon the roadway, substantially as above described, and then employing two sets of blocks—viz., one a principal set of blocks that shall form the wooden surface of the pavement, and an auxiliary set of blocks that shall form no part of the wooden surface of the pavement, but determine the dimensions of the tessellated cavities between the principal blocks, and then filling said tessellated cavities with broken stone, gravel, and tar, or other like material.

SAMUEL NICOLSON.

Witnesses:
STEPHEN A. GOODWIN,
DANIEL SHARP,
CHAS. F. THAYER.